United States Patent
Jeong et al.

(10) Patent No.: US 8,620,022 B2
(45) Date of Patent: Dec. 31, 2013

(54) EVENT STRUCTURE SYSTEM AND CONTROLLING METHOD AND MEDIUM FOR THE SAME

(75) Inventors: Moon-Sik Jeong, Seongnam-si (KR); Gyu-tae Park, Anyang-si (KR); Kaiqi Huang, Beijing (CN); Zhang Zhang, Beijing (CN)

(73) Assignees: Samsung Electronics Co., Ltd., Suwon-Si (KR); Institute of Automation Chinese Academy of Sciences, Beijing (CN)

( * ) Notice: Subject to any disclaimer, the term of this patent is extended or adjusted under 35 U.S.C. 154(b) by 1096 days.

(21) Appl. No.: 12/216,427

(22) Filed: Jul. 3, 2008

(65) Prior Publication Data

US 2009/0208111 A1    Aug. 20, 2009

(30) Foreign Application Priority Data

Feb. 18, 2008    (KR) .................. 10-2008-0014614

(51) Int. Cl.
*G06K 9/00*    (2006.01)
*G06K 9/62*    (2006.01)
*G06K 9/64*    (2006.01)
*G06K 9/68*    (2006.01)

(52) U.S. Cl.
USPC ........... 382/103; 382/107; 382/209; 382/217; 382/224; 382/226

(58) Field of Classification Search
USPC ......... 382/103, 107, 225, 236, 209, 217, 224, 382/226
See application file for complete search history.

(56) References Cited

U.S. PATENT DOCUMENTS

| | | | |
|---|---|---|---|
| 6,628,835 B1* | 9/2003 | Brill et al. ...................... | 382/226 |
| 7,263,472 B2* | 8/2007 | Porikli ............................. | 703/2 |
| 8,411,935 B2* | 4/2013 | Eaton et al. .................... | 382/159 |
| 8,478,048 B2* | 7/2013 | Ding et al. ..................... | 382/190 |
| 2008/0304565 A1* | 12/2008 | Sakhardande et al. ... | 375/240.12 |
| 2009/0135007 A1* | 5/2009 | Donovan et al. .............. | 340/540 |

OTHER PUBLICATIONS

Nevatia et al., "Hierarchical language-based representation of events in video streams," IEEE Conference on CVPRW 2003, vol. 4, pp. 39, Jun. 2003.*

Ivanov et al., "Recognition of visual activities and interactions by stochastic parsing," IEEE Trans. on PAMI, vol. 22, pp. 852-872, Aug. 2000.*

Zhang et al., "Complex activity representation and recognition by extended stochastic grammar," Proc. Asian Conf. Comput. Vis., 2006, pp. 150-159.*

Hongeng et al., "Video-based event recognition:activity representation and probabilistic recognition methods," Comput. Vis. Image Understnad., vol. 96, No. 2, pp. 129-162, 2004.*

Joo et al., "Recognition of multi-object events using attribute grammars," 2006 IEEE International Conference on Image Procesing, pp. 2897-2900, Oct. 2006.*

(Continued)

*Primary Examiner* — Anand Bhatnagar
*Assistant Examiner* — Soo Park
(74) *Attorney, Agent, or Firm* — Staas & Halsey LLP

(57) ABSTRACT

Disclosed are an event structure system and a method and medium for controlling the event structure system. The method includes recognizing multiple-person interaction primitives, composing an event by inference based on temporal relations using the multiple-person interaction primitive, and determining a final event by either eliminating an unnecessary event from the composed event, or adding a new event in the composed event.

23 Claims, 12 Drawing Sheets

FROM S1030

ELIMINATE UNNECESSARY EVENT BY MULTI-THREAD PARSING — S1041

ADD DELETED EVENT IN COMPOSED EVENT — S1042

END

(56) References Cited

OTHER PUBLICATIONS

Moore et al., "Recognizing multitasked activities from video using stochastic context-free grammar," Proc AAAI Conf. 2002.*

Piciarelli et al., "Trajectory clustering and its applications for video surveillance," IEEE Conference on AVSS 2005, pp. 40-45, Sep. 2005.*

Zhang et al., "Trajectory series analysis based event rule induction for visual surveillance," IEEE Conference on CVPR 2007, pp. 1-8, Jun. 2007.*

Ivanov et al., "Video surveillance of interactions", Second IEEE Workshop on Visual Surveillance, pp. 82-89, Jul. 1999.*

Hakeem et al., "Learning, detection and representation of multi-agent events in videos," Artificial Intelligence 171 (2007) 586-605, 2007.*

* cited by examiner 210   220

FIG. 9

$910 \sim < \{1\}, a1(1), [t1, t3] >$ $920 \sim < \{1,2\}, A, [t1, t4] >$ 911, 912, 913 label the three components of 910.
921, 922, 923 label the three components of 920.

EVENT STRUCTURE SYSTEM AND CONTROLLING METHOD AND MEDIUM FOR THE SAME

CROSS-REFERENCE TO RELATED APPLICATIONS

This application claims the priority benefit of Korean Patent Application No. 10-2008-0014614, filed on Feb. 18, 2008, in the Korean Intellectual Property Office, the disclosure of which is incorporated herein by reference.

BACKGROUND

1. Field

The present invention relates to an event structure system and a method and medium for controlling the same, and more particularly, to an event structure system and a method and medium for controlling the same which may recognize interaction between a plurality of objects based on an event.

2. Description of the Related Art

As recent terrorist attacks, theft, accidents, and the like frequently occur, interest in security is gradually increased. Accordingly, Charge-Coupled Device cameras (CCD) are increasingly installed in living environments such as apartment complexes, tall buildings in cities, and the like.

Demands for automated intrusion detection devices are increasing due to expansion of surveillance areas, an increase in the labor costs for surveillance personnel, distributed attention of guard personnel which has been proven by psychological experiments, and the like.

The intrusion detection devices such as security cameras are required to capture moving objects, and further required to interpret the meaning of videos to thereby cope with surrounding environments while simultaneously simply photographing target objects, and transmitting and storing the photographed target objects.

SUMMARY

An aspect of the present invention provides an event structure system and a method and medium for controlling the same, in which interaction between a plurality of persons or objects may be analyzed by a trajectory analysis. The interaction may be analyzed by an event based analysis which is different from a frame based analysis of each image, thereby more effectively classifying and recognizing the interaction.

An aspect of the present invention provides an event structure system and a method and medium for controlling the same, in which recognition of parallel temporal relations between a plurality of persons or objects may be performed, so that an interaction model between the plurality of persons or objects may be composed using an event based approach scheme, and recognition and analysis with respect to the plurality of persons or objects may be performed.

According to an aspect of the present invention, there is provided a method for controlling an event structure system, the method including: recognizing multiple-person interaction primitives from an image, which is displayed on a display screen; composing an event by inference based on temporal relations using the multiple-person interaction primitive; and determining a final event by either eliminating an unnecessary event from the composed event, or adding a new event in the composed event.

At least one of a trajectory and optical flow of a single person may be used to recognize multiple-person interaction primitives.

Also, the recognizing of multiple-person interactive primitives may include transforming an image plane including multiple persons into relative trajectory coordinates of a reference object corresponding to any single person of persons in the image plane; performing trajectory clustering in the relative trajectory coordinates; and recognizing the multiple-person interaction primitives by each trajectory cluster obtained by performing the trajectory clustering.

Also, the transforming may include performing a trajectory projection from the image plane to a ground plane; and performing another trajectory projection from the ground plane to the relative trajectory coordinates of the reference object.

Also, the performing of the trajectory clustering may include segmenting a relative trajectory interval by the origin of the relative trajectory coordinates; and performing a trajectory clustering algorithm based on similarity to obtain the trajectory clusters.

Also, the recognizing of the multiple-person interaction primitives by each of the trajectory clusters may recognize the multiple-person interaction primitives using a Hidden Markov Model (HMM) for modeling results obtained by performing the trajectory clustering.

Also, the determining of the final event may include eliminating an unnecessary event by Multi-Thread Parsing (MTP); computing a start point distance and an end point distance between two events to thereby infer temporal relations; re-generating an event disregarded due to errors, and adding the re-generated event in the composed event.

Also, an expansion of an Early-Stolcke parser model including the temporal relations may be used to eliminate the unnecessary event.

Also, the eliminating of the unnecessary event may further include determining whether the recognized two events are combined.

Also, the eliminating of the unnecessary event may include generating all the possible combinations of the event; limiting a temporal interval of the event; comparing a predetermined event rule and an event rule of the event; and eliminating an unnecessary event using event related results computed by the temporal interval constraint of the event and the combination of the event.

Also, the eliminating of the unnecessary event may further include requiring a set of identifications (IDs) of an event, where the IDs do not overlap each other.

Also, the set of IDs may be a set of the multiple-person interaction primitives composing the event.

At least one computer-readable recording medium may store a program for implementing methods of the present invention.

According to an aspect of the present invention, there is provided a system for controlling an event structure, the system including: a multiple-person interaction primitives recognizing unit to recognize multiple-person interaction primitives from an image, which is displayed on a display screen; and a multi-thread parser to compose an event by inference based on temporal relations using the multiple-person interaction primitives, and to determine a final event by either eliminating an unnecessary event from the composed event or adding a new event in the composed event.

BRIEF DESCRIPTION OF THE DRAWINGS

These and/or other aspects, features, and advantages of the present invention will become apparent and more readily appreciated from the following detailed description of exemplary embodiments of the invention, taken in conjunction with the accompanying drawings of which:

FIGS. 7 through 9 are diagrams illustrating a method for displaying an event rule according to an exemplary embodiment of the present invention;

DETAILED DESCRIPTION OF EMBODIMENTS

Figure 1:
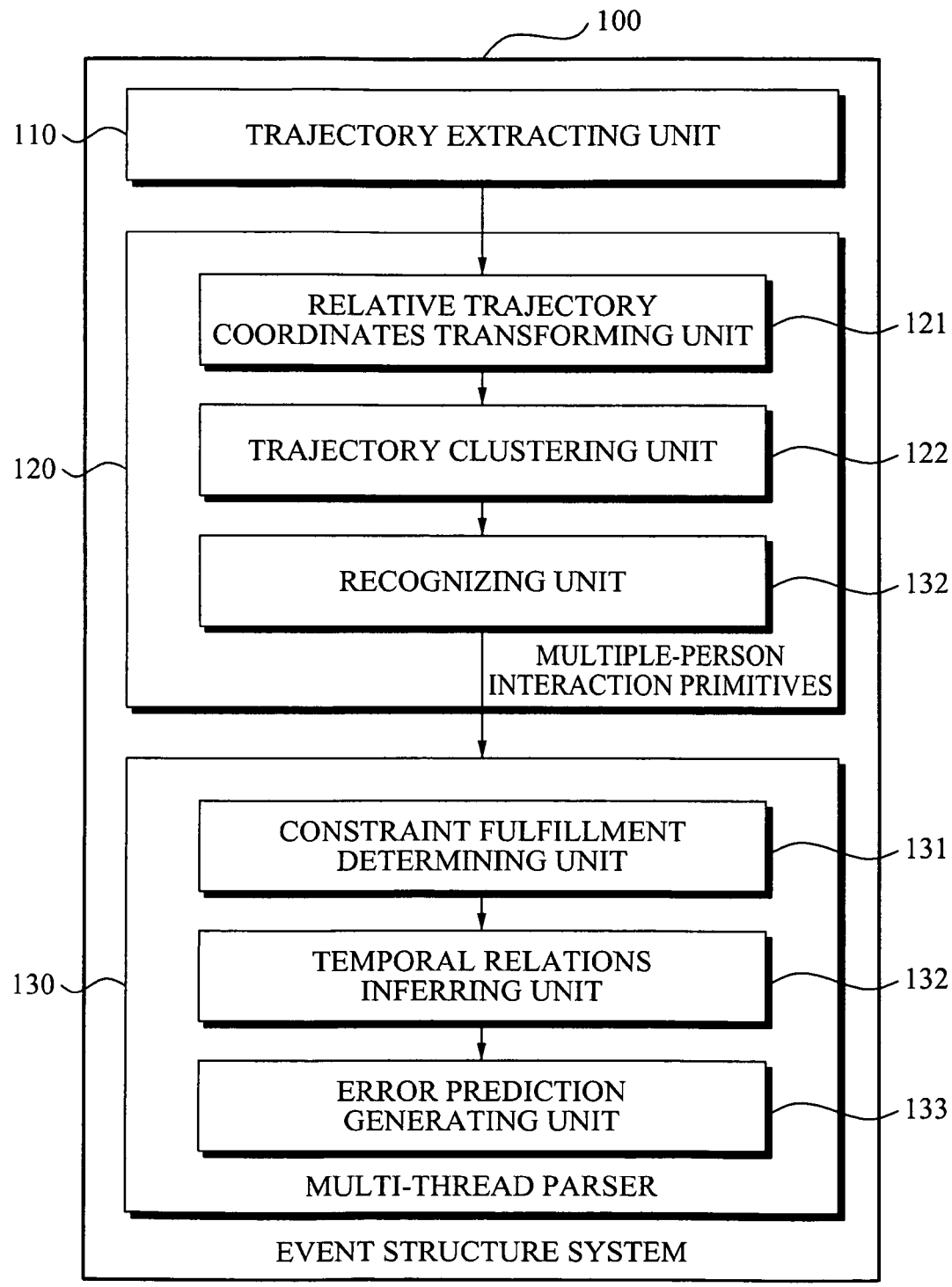
FIG. 1 is a configuration diagram illustrating an event structure system according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a configuration diagram illustrating an event structure system 100 according to an exemplary embodiment of the present invention.

For reference, a module directly or indirectly related to the present invention is mainly illustrated in drawings. However, blocks illustrated in the present invention may be designed as a module, and the module denotes one unit for processing a specific function or operation. Also, the module may be implemented in hardware or software, or any combination thereof.

As illustrated in FIG. 1, the event structure system 100 includes a trajectory extracting unit 110, a multiple-person interaction primitives recognizing unit 120, and a multi-thread parser 130.

Also, the multiple-person interaction primitives recognizing unit 120 includes a relative trajectory coordinates transforming unit 121, a trajectory clustering unit 122, and a recognizing unit 123, and the multi-thread parser 130 includes a constraint fulfillment determining unit 131, a temporal relations inferring unit 132, and an error prediction generating unit 133.

The event structure according to the present invention may denote a data structure used for describing how interaction between multiple persons is comprised by interaction primitives. The event structure may include interaction primitives and temporal relations between interaction primitives.

The interaction primitives according to the present exemplary embodiment of the invention may denote the most basic unit indicating that a single person approaches or separates from a reference object, and may be expressed as a trajectory in relative coordinates.

The interaction according to the present exemplary embodiment of the invention may denote a combination of the interaction primitives, and the interaction primitives may denote a sub-event of the interaction. As an example of the interaction, 'follow and reach' may be given.

The trajectory extracting unit 110 may extract moving trajectories of multiple persons. Specifically, a plurality of objects on an image plane, for example, moving trajectories of multiple persons is respectively tracked to thereby extract the corresponding trajectory value.

The multiple-person interaction primitives recognizing unit 120 may recognize the interaction primitives between the multiple persons using the relative coordinates of the multiple persons.

The multiple-person interaction primitives recognizing unit 120 may include the relative trajectory coordinates transforming unit 121, the trajectory clustering unit 122, and the recognizing unit 123.

The relative trajectory coordinates transforming unit 121 transforms an image plane including multiple persons into relative trajectory coordinates of the reference object corresponding to any single person of multiple persons. For example, the image plane is transformed into a vertical view through projection when the image plane is photographed from an angle, thereby completing transformation into the relative trajectory coordinates.

Specifically, the relative trajectory coordinates transforming unit 121 performs a trajectory projection from the image plane to a ground plane, and further performs the trajectory projection from the ground plane to the relative coordinates of the reference object.

The trajectory clustering unit 122 performs a trajectory clustering in the relative coordinates. In this instance, the trajectories are segmented into intervals, pass though the origin of the relative coordinates, and then are clustered.

More specifically, the trajectory clustering unit 122 segments the relative trajectory interval by the origin of the relative coordinates, and performs a trajectory clustering algorithm based on similarity to obtain the trajectory clusters.

In this instance, the trajectory clustering unit 122 may use similarity matrix computation and K-means clustering, and a distance computation method of a Principal Component Analysis (PCA) and the Euclidean geometry may be used for the purpose of computing the similarity between the trajectories.

The recognizing unit 123 recognizes the interaction primitives by each of the trajectory clusters obtained by performing the trajectory clustering.

In this instance, the recognizing unit 123 may recognize the interaction primitives by a Hidden Markov Model (HMM) for modeling results obtained by performing the trajectory clustering.

The multi-thread parser 130 may compose an event by inference based on temporal relations using the interaction primitives between the multiple persons, and eliminate an unnecessary event from the composed event or add a new event in the composed event, thereby determining a final event.

In the interaction between the multiple persons, it is noted that different operations may be simultaneously performed in parallel temporal relations.

On the other hand, the multi-thread parser 130 may use an expansion of an Early-Stolcke parser model, and determine whether recognized two events are combined.

The multi-thread parser 130 may include the constraint fulfillment determining unit 131, the temporal relations inferring unit 132, and the error prediction generating unit 133.

The constraint fulfillment determining unit 131 eliminates an unnecessary event by multi-thread parsing.

More specifically, the constraint fulfillment determining unit 131 may include an Identification (ID) set constraint unit (not shown) for generating all the possible combinations of the event, a temporal interval constraint unit (not shown) for constraining a temporal interval of the event, and a maximum error constraint unit (not shown) for eliminating an unnecessary event using event related results computed by the ID set constraint unit and the temporal interval constraint unit. Specifically, the maximum error constraint unit may eliminate the unnecessary event based on the event related results computed by the temporal interval constraint unit when too many events are generated by the ID set constraint unit, thereby performing the parsing process more quickly.

The temporal relations inferring unit 132 computes a start point distance and an end point distance between the two events to thereby infer the temporal relations.

For example, 'start', 'during' and the like may be confused due to the uncertainty in recognizing the event. Accordingly, in order to reduce the uncertainty in recognizing the event, the temporal relations inferring unit 132 may use a temporal relation inference scheme of a modified Allen's temporal logic relations type.

The error prediction generating unit 133 re-generates an event disregarded due to errors, and adds the re-generated event in the composed event. More specifically, for example, when a new event is recognized, the error prediction generating unit 133 may recognize an event rule including the event acting as a sub-event, check the event under the event rule, and then generate an event not being recognized based on results obtained by inferring the temporal relations between the recognized sub-event and another recognized sub-event.

As a result, addition and elimination of errors may be more effectively controlled, thereby more effectively obtaining behavior analysis with respect to a person or object.

FIGS. 2 through 6 are diagrams illustrating a method for recognizing multiple-person interaction primitives using relative coordinates between multiple persons according to an exemplary embodiment of the present invention.

Figure 2:
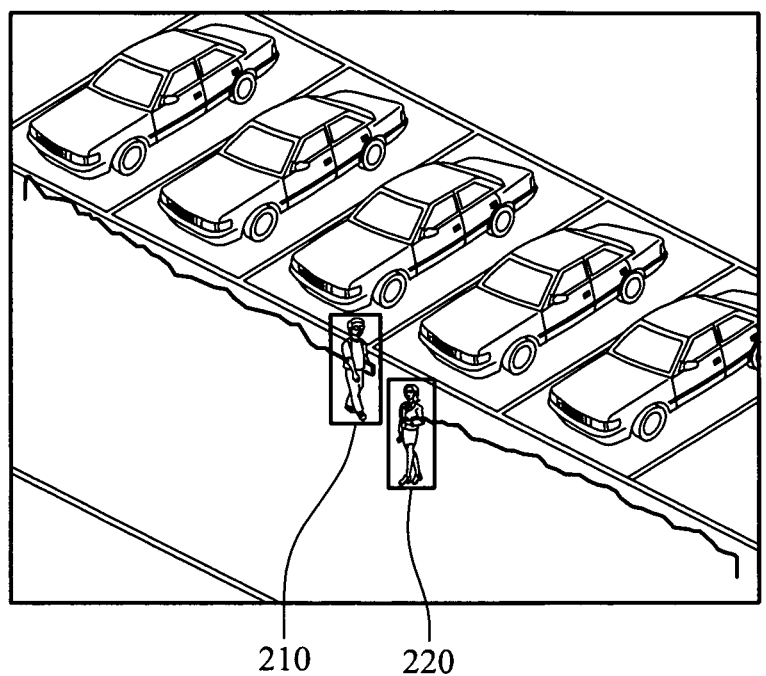
FIGS. 2 through 6 are diagrams illustrating a method for recognizing multiple-person interaction primitives using relative coordinates between multiple-person according to an exemplary embodiment of the present invention.
Figure 3:
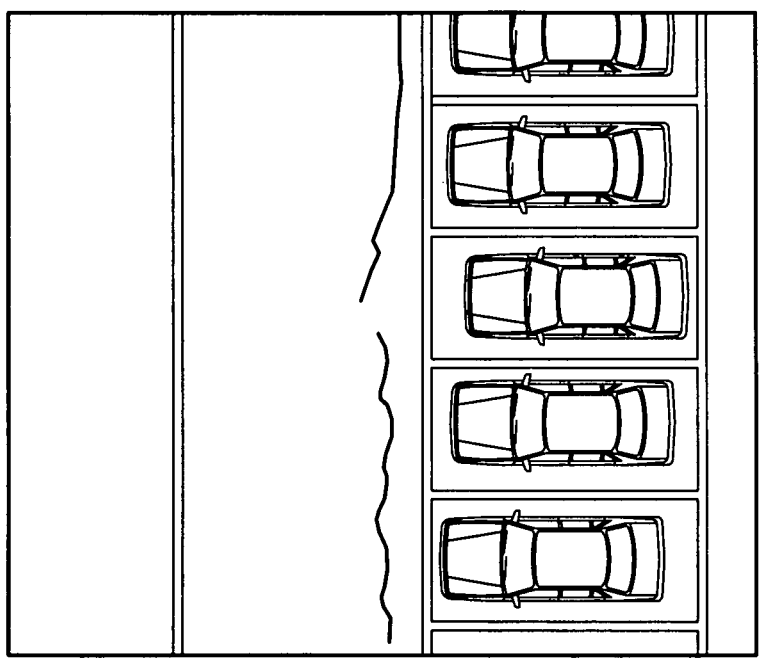
Figure 5:
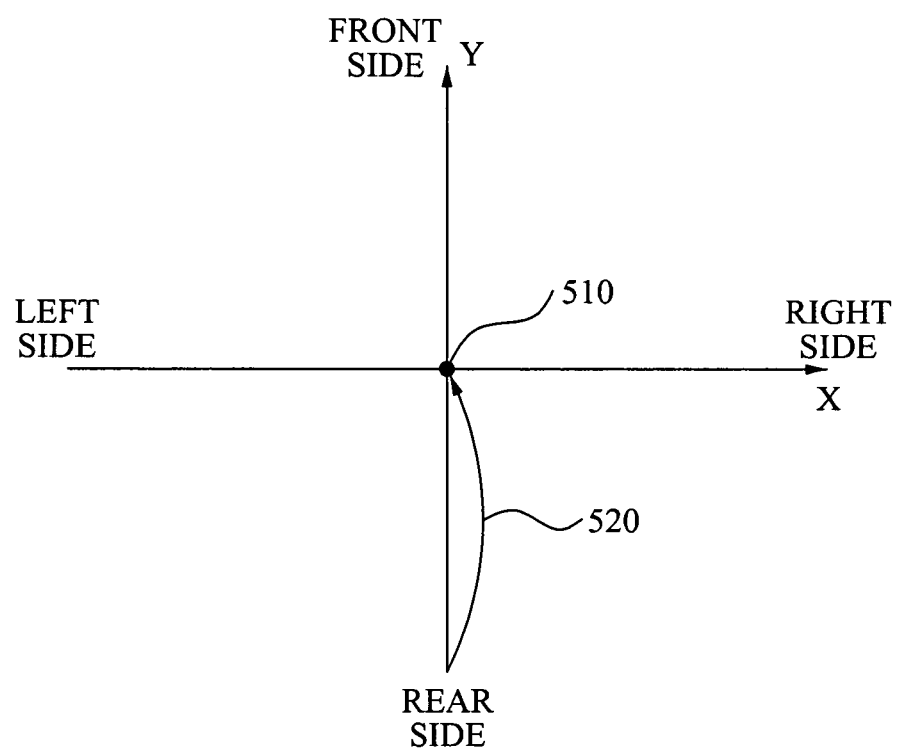
Figure 6:
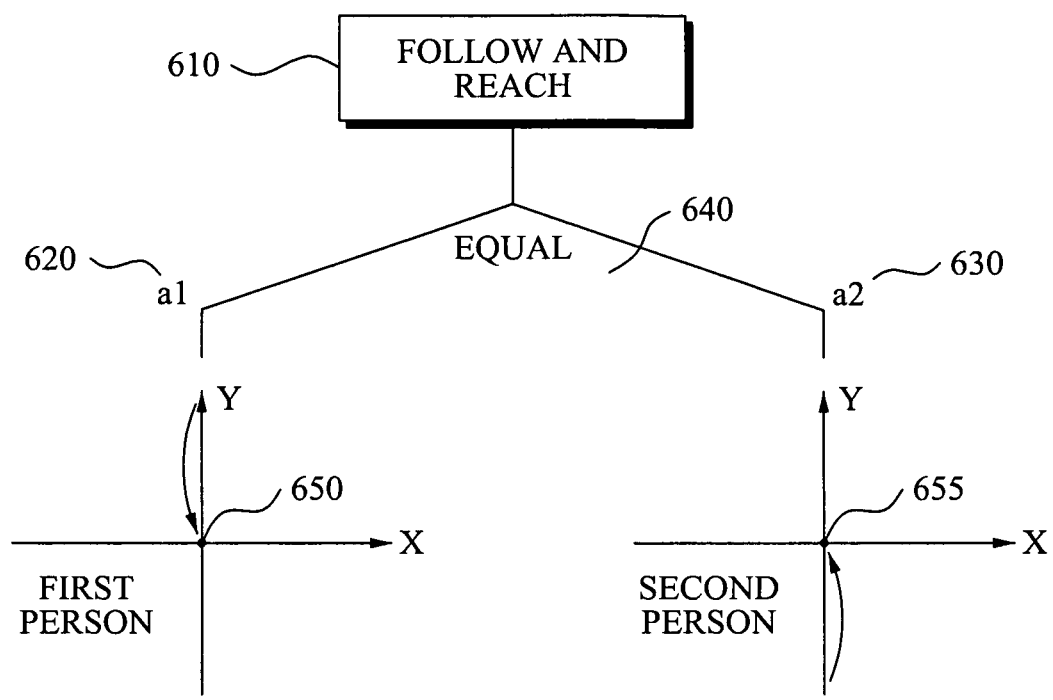

More specifically, FIG. 2 is a diagram illustrating a method for extracting trajectories of a plurality of objects or persons according to an exemplary embodiment of the invention, and FIG. 3 is a diagram illustrating a method for transforming an image plane including the person of FIG. 2 into relative trajectory coordinates of a reference object corresponding to any one person of the plurality of persons. Also, FIG. 4 is a diagram illustrating a method for performing a trajectory clustering in relative coordinates according to an exemplary embodiment of the invention, FIG. 5 is a diagram illustrating a method for recognizing multiple-person interaction primitives according to an exemplary embodiment of the invention, and FIG. 6 is a diagram illustrating a method for recognizing multiple-person interaction primitives according to another exemplary embodiment of the invention.

As illustrated in FIG. 2, trajectories of the plurality of objects or persons 210 and 220 in the image plane are traced, thereby extracting trajectory values.

Then, as illustrated in FIG. 3, the image plane including the plurality of objects or persons is transformed into relative trajectory coordinates of any one of reference objects or persons. Specifically, the relative trajectory coordinates 121 may perform a trajectory projection from the image plane to a ground plane, and also perform the trajectory projection from the ground plane to the relative coordinates of the reference object.

Figure 4:
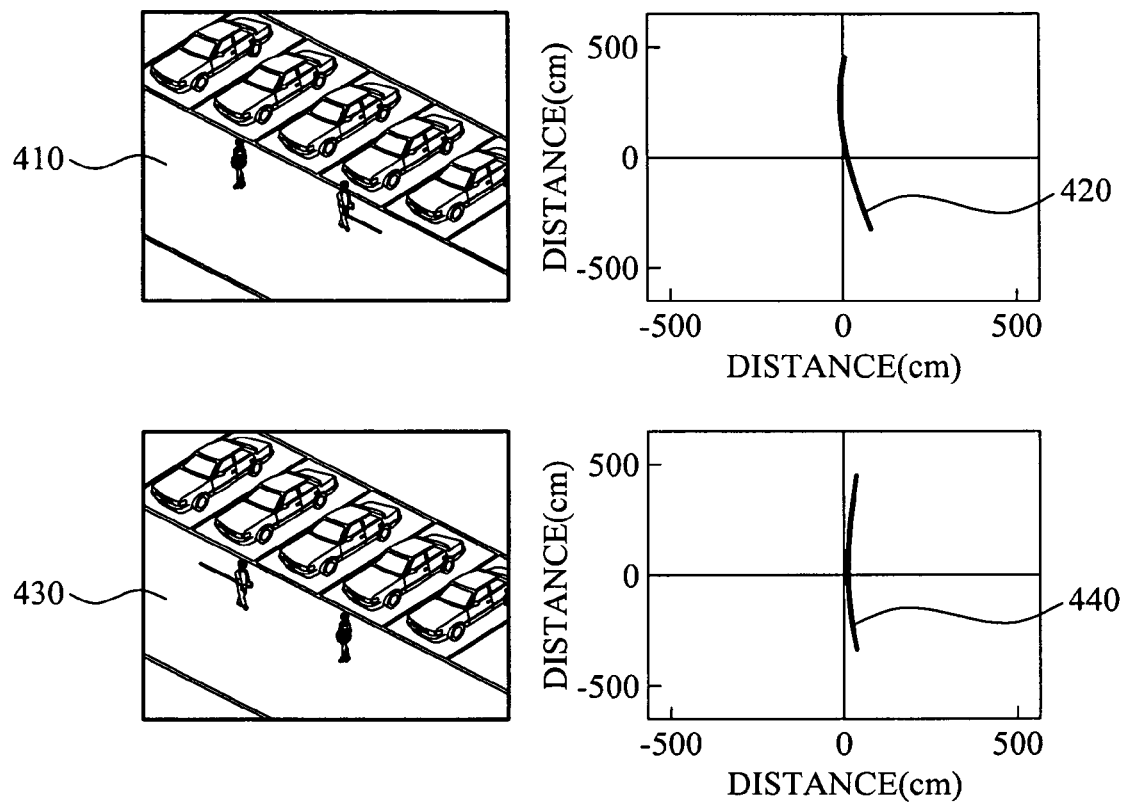

Then, as illustrated in FIG. 4, a trajectory clustering is performed in the relative coordinates.

FIG. 4 illustrates states 410 and 430 where first and second persons approach the reference object, and also illustrates trajectories 420 and 430 of each of the first and second persons. In this instance, the trajectories 420 and 440 are segmented into intervals, pass through the origin of the relative coordinates, and performs a clustering. More specifically, the relative trajectory intervals 420 and 440 are segmented by the origin of the relative coordinates, and a trajectory clustering algorithm is performed based on similarity in order to obtain trajectory clusters.

Accordingly, as illustrated in FIG. 5, the multiple person interaction primitives may be recognized by each of the trajectory clusters obtained by performing the trajectory clustering. In this instance, FIG. 5 illustrates a state where an object approaches the reference object 510 from a rear side (of the relative coordinates) and designates 'a2'.

More specifically, a motion direction 520 to the reference object 510 may indicate a Y shaft direction in the relative coordinates, and an X shaft and a Y shaft are orthogonal to each other. The motion direction 520 may designate a trajectory pattern indicating how a moving object approaches the reference object 510.

FIG. 6 illustrates structures of 'follow and reach' 610 and the corresponding sub-events 620 and 630, each corresponding to interaction. In this instance, an Equal 640 may designate temporal relation between two sub-events 620 and 630, and indicate a state where the two sub-events 620 and 630 are simultaneously generated.

Specifically, when a case (a1) 620 where the first person approaches the reference object 650 from a front side (of the relative coordinates) and a case (a2) 630 where the second person approaches the reference object 650 from a rear side are simultaneously created, a 'follow and reach' 610 event may be determined to be generated.

In this instance, in order to recognize the interaction primitives, a HMM for modeling results obtained by performing the trajectory clustering algorithm may be used.

Figure 7:
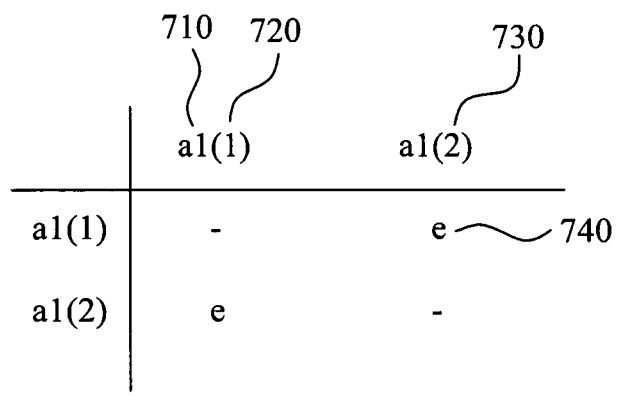
Figure 8:
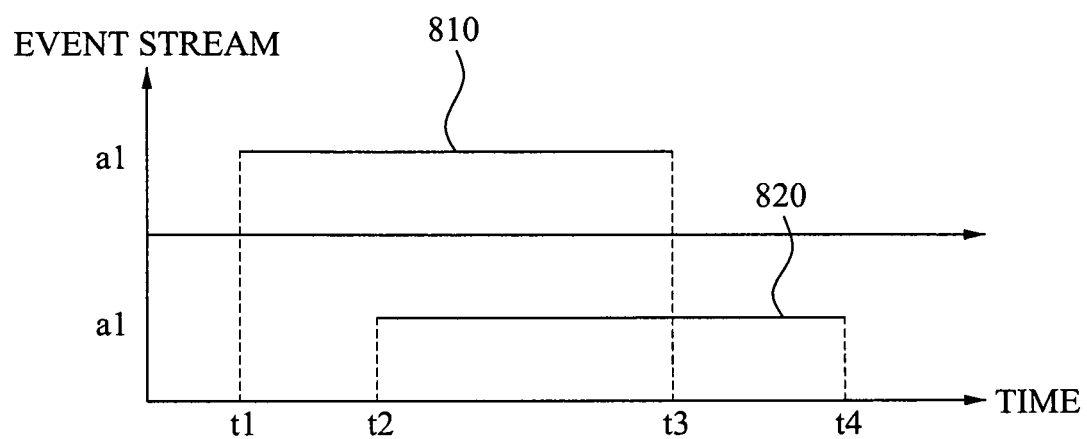

FIGS. 7, 8, and 9 are diagrams illustrating a method for displaying an event rule according to the present exemplary embodiment.

The event rule may be configured as illustrated in the following Equation 1.

$$A \rightarrow a1(1)a1(2)[1], \qquad \text{[Equation 1]}$$

wherein A denotes an event, 'a1' denotes a type of a sub-event, and '(1)' and '(2)' denote a person performing the event.

Referring to FIG. 7 and Equation 1, 'a1' 710 may denote a type of a sub event of an A event, '(1)' 720 and '(2)' 730 denote a person performing the A event, that is, the first and second persons, and 'e' 740 may denote a state where the sub-event is simultaneously generated. Accordingly, FIG. 7 may designate a state where the first person 720 and the second person 730 simultaneously perform 'a1' 710 event.

Complex temporal relations may be included in the above-described event rule representation, and displayed.

FIG. 8 is a diagram illustrating relation between time and an event stream according to an exemplary embodiment of the present invention, illustrates the A event of FIG. 7, and describes an event in which two persons mutually approach.

The above-described mutual approach event may be configured of two sub-events simultaneously generated, and one sub-event from the two sub-events may denote 'a1' indicating that a first person 810 approaches a second person 820 in relative coordinates of the second person 820, and the remaining sub-event may denote another 'a1' indicating that the second person approaches the first person in relative coordinates of the first person.

The mutual approach event may be displayed by a method for displaying an event as illustrated in FIG. 9.

As illustrated in FIG. 9, in a method 910 for displaying a first event, '{1}'911 denotes a first person 911, 'a1(1)' denotes an event performed by the first person 911, and '[t1, t3]' 913 denotes an interval during which the event is performed. In this instance, the interval exists on a temporal axis. Specifically, in the method 910 for displaying the first event, the first person 911 performs an 'a1' operation 912 for a time from t1 to t3.

Accordingly, the A event performed by the first person 810 and the second person 820 may be expressed by an event expressing method 920 illustrated in FIG. 9, and the event expressing method 920 may indicate that first and second persons 921 perform the A event for a time from t1 to t4.

Figure 10:
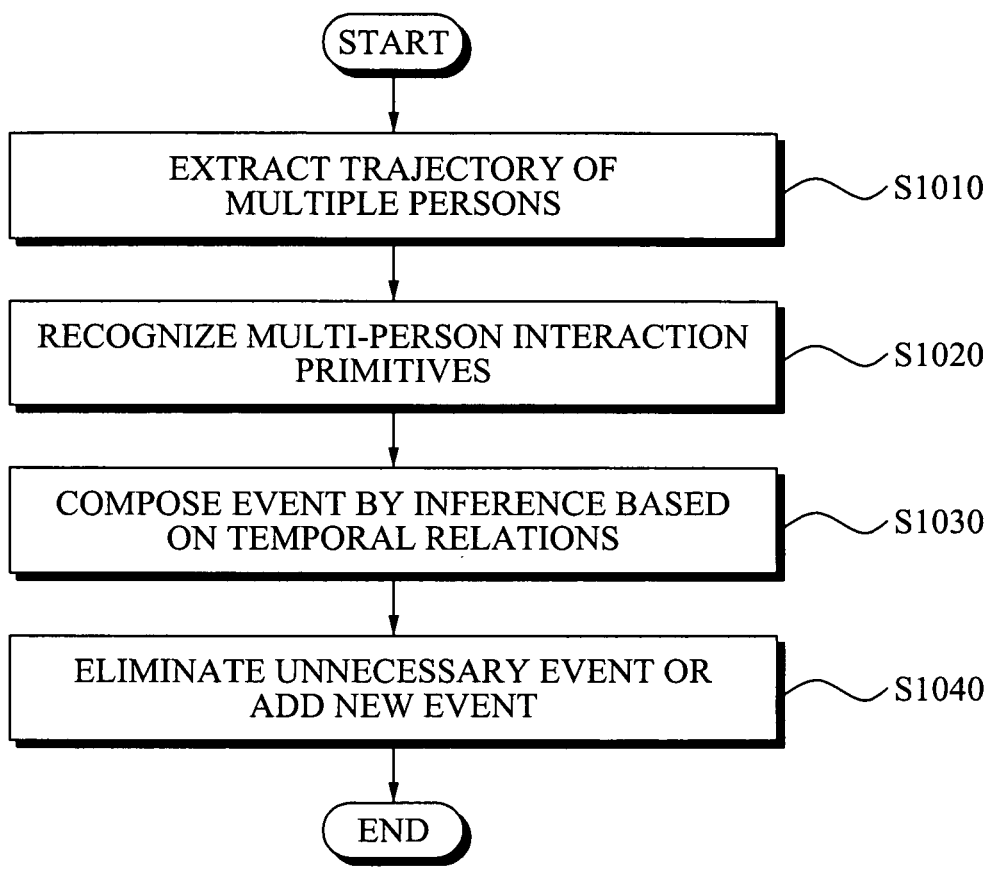
FIG. 10 is a flowchart illustrating a method for controlling an event structure system according to an exemplary embodiment of the invention.

FIG. 10 is a flowchart illustrating a method for controlling an event structure system according to an exemplary embodiment of the invention. The method for controlling the event structure system according to the present exemplary embodiment of the invention will be described herein with reference to FIG. 10.

In operation S1010, trajectory values of multiple persons are extracted. In operation S1020, interaction primitives of the multiple persons are recognized using relative coordinates of the extracted trajectory values.

Next, in operation S1030, an event is composed by inference based on temporal relations using the interaction primitives of the multiple persons.

In operation S1040, an unnecessary event is eliminated from the composed event, or a new event is added in the composed event, thereby determining a final event.

Figure 11:
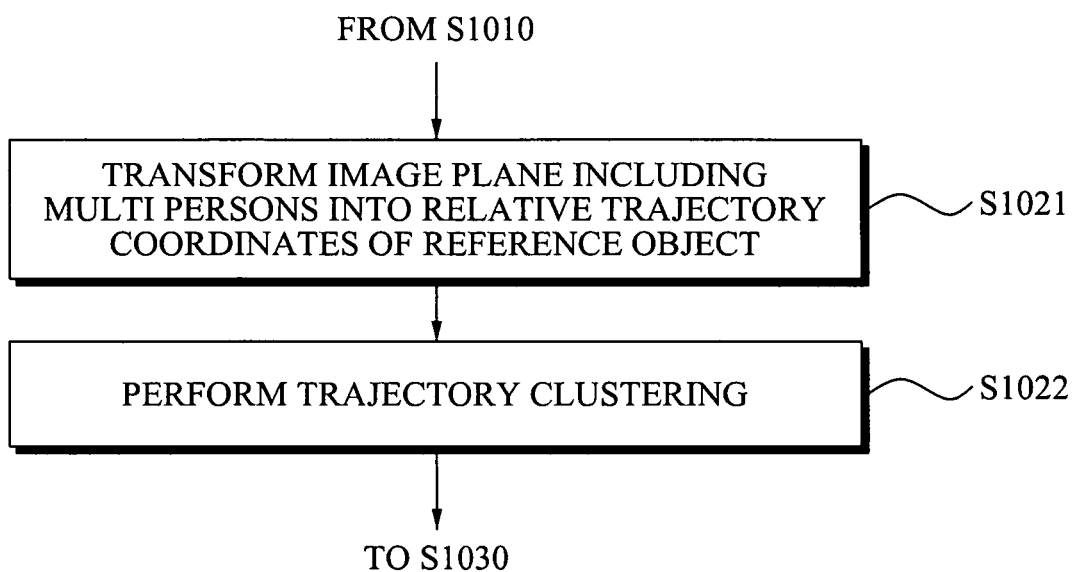
FIG. 11 is a flowchart illustrating an operation for recognizing multiple-person interaction primitives according to an exemplary embodiment of the present invention.

FIG. 11 is a flowchart illustrating an operation for recognizing multiple person interaction primitives according to an exemplary embodiment of the present invention, in detail. The operation for recognizing multiple person interaction primitives according to the present exemplary embodiment of the invention will be described in detail with reference to FIG. 11.

In operation S1021, an image plane including the multiple persons is transformed into relative trajectory coordinates of a reference object corresponding to any one person of the multiple persons.

In this instance, a trajectory projection is performed from the image plane to a ground plane, and the trajectory projection is performed from the ground plane to the relative coordinates of the reference object, thereby transforming to the relative trajectory coordinates.

Next, in operation S1022, a trajectory clustering is performed in the relative coordinates, and the interaction primitives are recognized by each of the trajectory clusters obtained by performing the trajectory clustering.

In this instance, by the performance of the trajectory clustering in the relative coordinates, the relative trajectory interval may be segmented by the origin of the relative coordinates, and a trajectory clustering algorithm may be performed based on similarity in order to obtain the trajectory clusters.

Also, the interaction primitives may be recognized by the trajectory clusters obtained by performing the trajectory clustering using the HMM for modeling results obtained by performing the trajectory clustering.

Figure 12:
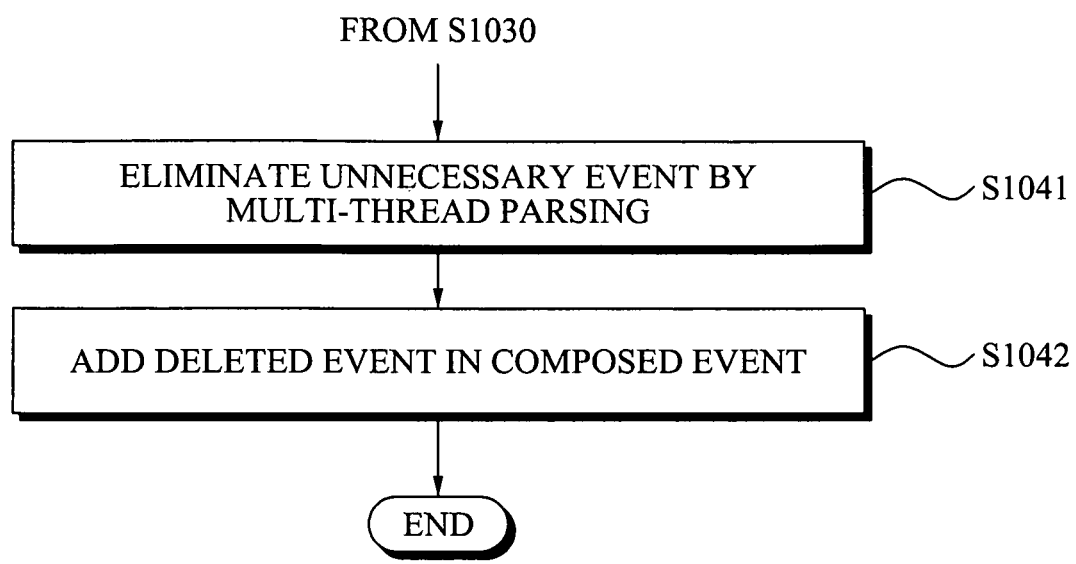
FIG. 12 is a flowchart illustrating an operation for determining a final event according to an exemplary embodiment of the invention.

FIG. 12 is a flowchart illustrating an operation for determining a final event by either eliminating an unnecessary event from a composed event or adding a new event in the composed event according to an exemplary embodiment of the present invention.

In operation S1041, the unnecessary event is eliminated by a multi-thread parsing, and a start point distance and an end point distance between two events are computed, thereby inferring temporal relations.

In this instance, the unnecessary event may be eliminated using an expansion of the existing Early-Stolcke parser. Here, the expansion may additionally include temporal relations and error prediction generation unit. Also, an operation for determining whether the recognized two events are combined may be included.

More specifically, the elimination of the unnecessary event by the multi-thread parsing may be performed by eliminating the unnecessary event using event related results computed by generating all the possible combinations of the event and limiting a temporal interval of the event. Also, the operation for eliminating the unnecessary may include an operation for requiring a set of Identifications (IDs) of the event, where the IDs do not overlap each other. In this instance, the ID set may denote a set of the interaction primitives composing the event.

Next, in operation S1042, an event eliminated by errors is re-generated, and the re-generated event is added in the composed event.

Thus, according to the present invention, interaction between a plurality of persons or objects may be analyzed by a trajectory analysis. Here, the interaction may be analyzed by an event based analysis which is different from a frame based analysis of each image, thereby more effectively classifying and recognizing the interaction.

Also, according to the present invention, recognition of parallel temporal relations between a plurality of persons or objects may be performed, so that an interaction model between the plurality of persons or objects may be composed using an event based approach scheme, and recognition and analysis with respect to the plurality of persons or objects may be performed.

In addition to the above described embodiments, exemplary embodiments of the present invention can also be implemented through computer readable code/instructions in/on a medium/media, e.g., a computer readable medium, to control at least one processing element to implement any above described exemplary embodiment. The medium can correspond to any medium/media permitting the storing (recording) of the computer readable code/instructions.

The medium/media and program instructions may be those specially designed and constructed for the purposes of the present invention, or they may be of the kind well-known and available to those having skill in the computer software arts. Examples of computer-readable medium/media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The medium/media may also be a distributed network, so that the computer readable code/instructions are stored and executed in a distributed fashion.

Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Still further, as only an example, the processing element could include a processor or a computer processor, and processing elements may be distributed and/or included in a single device. The computer readable code/instructions may also be executed and/or embodied in at least one application specific integrated circuit (ASIC) or Field Programmable Gate Array (FPGA).

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method for controlling an event structure system, the method comprising:
   recognizing multiple-person interaction primitives from an image, which is displayed on a display screen;
   composing an event by inference based on temporal relations using the multiple-person interaction primitive; and
   determining a final event by eliminating an unnecessary event from the composed event and adding a new event in the composed event after the unnecessary event is eliminated.

2. The method of claim 1, wherein at least one of a trajectory and optical flow of a single person is used to recognize multiple-person interaction primitives.

3. The method of claim 1, wherein an expansion of an Early-Stolcke parser model including the temporal relations is used to eliminate the unnecessary event.

4. At least one computer-readable recording medium storing a program for implementing the method of claim 1.

5. A method for controlling an event structure system, the method comprising:
   recognizing multiple-person interaction primitives from an image, which is displayed on a display screen;
   composing an event by inference based on temporal relations using the multiple-person interaction primitive; and
   determining a final event by either eliminating an unnecessary event from the composed event, or adding a new event in the composed event,
   wherein the recognizing of multiple-person interaction primitives comprises:
   transforming an image plane including multiple persons into relative trajectory coordinates of a reference object corresponding to any single person of multiple persons in the image plane;
   performing trajectory clustering in the relative trajectory coordinates; and
   recognizing the multiple-person interaction primitives by each trajectory cluster obtained by performing the trajectory clustering.

6. The method of claim 5, wherein the transforming comprises:
   performing a trajectory projection from the image plane to a ground plane; and
   performing another trajectory projection from the ground plane to the relative trajectory coordinates of the reference object.

7. The method of claim 5, wherein the performing of the trajectory clustering comprises:
   segmenting a relative trajectory interval by the origin of the relative trajectory coordinates; and
   performing a trajectory clustering algorithm based on similarity to obtain the trajectory clusters.

8. The method of claim 5, wherein the recognizing of the multiple-person interaction primitives by each of the trajectory clusters recognizes the multiple-person interaction primitives using a Hidden Markov Model (HMM) for modeling results obtained by performing the trajectory clustering.

9. A method for controlling an event structure system, the method comprising:
   recognizing multiple-person interaction primitives from an image, which is displayed on a display screen;
   composing an event by inference based on temporal relations using the multiple-person interaction primitive; and
   determining a final event by either eliminating an unnecessary event from the composed event, or adding a new event in the composed event,
   wherein the determining of the final event comprises:
   eliminating an unnecessary event by Multi-Thread Parsing (MTP);
   computing a start point distance and an end point distance between two events to thereby infer temporal relations;
   re-generating an event disregarded due to errors; and
   adding the re-generated event in the composed event.

10. The method of claim 9, wherein the eliminating of the unnecessary event further comprises determining whether the recognized two events are combined.

11. The method of claim 9, wherein the eliminating of the unnecessary event comprises:
    generating all the possible combinations of the event;
    limiting a temporal interval of the event;
    comparing a predetermined event rule and an event rule of the event; and
    eliminating an unnecessary event using event related results computed by the temporal interval constraint of the event and the combination of the event.

12. The method of claim 11, wherein the eliminating of the unnecessary event further comprises requiring a set of identifications (IDs) of an event, where the IDs do not overlap each other.

13. The method of claim 12, wherein the set of IDs is a set of the multiple-person interaction primitives composing the event.

14. A system for controlling an event structure, the system comprising:
    a multiple-person interaction primitives recognizing unit to recognize multiple-person interaction primitives from an image, which is displayed on a display screen; and
    a multi-thread parser to compose an event by inference based on temporal relations using the multiple-person interaction primitives, and to determine a final event by eliminating an unnecessary event from the composed event and adding a new event in the composed event after the unnecessary event is eliminated.

15. The system of claim 14, further comprising at least one of:
    a trajectory extracting unit to extract a trajectory of multiple persons; and
    an optical flow extracting unit to extract features related with behaviors of multiple persons based on a speed in which a pixel on the display screen displaying the person is moved to the next position within a predetermined period.

16. The system of claim 14, wherein the multi-thread parser eliminates the unnecessary event using an expansion of an Early-Stolcke parser model including the temporal relations.

17. The system of claim 14, wherein the multi-thread parser determines whether the recognized two events are combined.

18. A system for controlling an event structure, the system comprising:

a multiple-person interaction primitives recognizing unit to recognize multiple-person interaction primitives from an image, which is displayed on a display screen; and a multi-thread parser to compose an event by inference based on temporal relations using the multiple-person interaction primitives, and to determine a final event by either eliminating an unnecessary event from the composed event or adding a new event in the composed event, wherein the multiple-person interaction primitives recognizing unit comprises:

a relative trajectory coordinates transforming unit to transform an image plane including the multiple persons into relative trajectory coordinates of a reference object corresponding to any single person of the multiple persons;

a trajectory clustering unit to perform trajectory clustering in the relative trajectory coordinates; and a recognizing unit to recognize the multiple-person interaction primitives by each trajectory cluster obtained by performing the trajectory clustering via the trajectory clustering unit.

19. The system of claim 18, wherein the relative trajectory coordinates transforming unit performs a trajectory projection from the image plane to a ground plane, and performs another trajectory projection from the ground plane to the relative coordinates of the reference object.

20. The system of claim 18, wherein the trajectory clustering unit segments a relative trajectory interval by the origin of the relative trajectory coordinates, and performs a trajectory clustering algorithm based on similarity for the purpose of obtaining the trajectory clusters.

21. The system of claim 18, wherein the recognizing unit recognizes the multiple-person interaction primitives using a HMM for modeling results obtained by performing the trajectory clustering.

22. A system for controlling an event structure, the system comprising:

a multiple-person interaction primitives recognizing unit to recognize multiple-person interaction primitives from an image, which is displayed on a display screen; and a multi-thread parser to compose an event by inference based on temporal relations using the multiple-person interaction primitives, and to determine a final event by either eliminating an unnecessary event from the composed event or adding a new event in the composed event, wherein the multi-thread parser comprises:

a constraint fulfillment determining unit to eliminate an unnecessary event by multi-thread parsing;

a temporal relations inferring unit to compute a start point distance and an end point distance between two events to thereby infer temporal relations; and an error prediction generating unit to re-generate an event disregarded due to errors, and to add the re-generated event in the composed event.

23. The system of claim 22, wherein the constraint fulfillment determining unit comprises:

an ID set constraint unit to generate all the possible combinations of the event;

a temporal interval constraint unit to constrain a temporal interval of the event;

a comparing unit to compare a predetermined event rule and an event rule of the event; and a maximum error constraint unit to eliminate an unnecessary event using event related results computed by the ID set constraint unit and the temporal interval constraint unit.

* * * * *